United States Patent [19]

Hart, Jr. et al.

[11] 4,076,784
[45] Feb. 28, 1978

[54] PROCESS FOR COLOR AND SURFACE STABILIZATION IN FORMING WATER-EXTENDABLE POLYESTER RESIN PLASTICS AND THE LIKE

[76] Inventors: Maurice Wright Hart, Jr.; William Carlo Hart, both of 714 Anastia Ave., both of Coral Gables, Fla. 33055

[21] Appl. No.: 656,637

[22] Filed: Feb. 9, 1976

[51] Int. Cl.$^2$ ............................................. C08L 67/06
[52] U.S. Cl. ........................... 264/102; 260/29.6 NR; 264/236; 264/294; 264/331; 264/335; 264/336
[58] Field of Search ................. 264/331, 41, 45.5, 78, 264/299, 328, 300, 301, 101, 102, 294, 236, 335, 336; 260/29.6 NR

[56] References Cited

U.S. PATENT DOCUMENTS

| | | | |
|---|---|---|---|
| 2,373,488 | 4/1945 | Marks | 264/331 |
| 2,997,745 | 8/1961 | Kroecker | 264/331 |
| 3,256,219 | 6/1966 | Will | 260/29.6 NR |
| 3,275,734 | 9/1966 | Rabenold | 264/316 |
| 3,726,819 | 4/1973 | Dijkhuizen | 264/41 |
| 3,740,353 | 6/1973 | Patrick et al. | 260/29.6 NR |
| 3,766,102 | 10/1973 | Pietsch et al. | 260/29.6 NR |
| 3,779,966 | 12/1973 | Weeks et al. | 260/861 |
| 3,806,563 | 4/1974 | Lammers | 264/41 |

OTHER PUBLICATIONS

"Polyesters as Casting Resins", Weeks, Plastics, 11-1947, vol. 11, pp. 588-592 . . .
"Organic Peroxide Catalysts for Polyesters", Rybolt et al., Modern Plastics, vol. 26, 4-1949, pp. 101-103, 150, 152, 154 & 157 . . .

*Primary Examiner*—Jeffery R. Thurlow
*Attorney, Agent, or Firm*—Rines and Rines; Shapiro and Shapiro

[57] ABSTRACT

This disclosure is concerned with stabilizing the color and surface of catalytically cured water-extendable polyester resin plastics and the like by appropriate constituent proportions and mold wall selection that enable effecting critical sealing to predetermined portions of the mold to prevent air flow or communication at the mold-plastic mass interfaces during the gel cycle.

27 Claims, No Drawings

PROCESS FOR COLOR AND SURFACE STABILIZATION IN FORMING WATER-EXTENDABLE POLYESTER RESIN PLASTICS AND THE LIKE

The present invention relates to plastic forming or molding processes and techniques, being more particularly directed to the catalytic curing of water-extendable polyester resins and the like.

Such water-extendable polyester plastics (including phthalic anhydride or isopthalic acid, maleic or fumerate anhydride used with propylene glycol, with cross-linking styrene and organic peroxide catalyst) have been introduced for use as low-cost, simply formed materials suitable for wood substitute in arts and crafts usage, frames and other decorative and functional articles as described, for example, in 1969-1970 Modern Plastics Encyclopedia, "Polyesters", R. H. Leitheiser, p. 170, on, and the references cited therein; Scientific Shortcut, May–June 1971, "WEP Polyesters Extendable With Water" and "Coatings for WEP Polyester Castings", G. Swanson; Ashland Chemicals Technical Data Sheets, May 1974 AROPOL-WEP 661-P; Modern Plastics, October, 1970 advertisement of American Cyanamid Company re "Laminac" polyester resin products; and U.S. Pat. No. 3,256,219.

Though the above literature speaks of white finish, such is frequently not obtained in practice. Where a white finish is desired directly in the cured product, indeed, without streaks, patches, a characteristic brownish or other cast or bleeding, discolored or mottled areas, or other texture variations, visible pores and other discontinuities, however, additional finishing operations have been required; and should painted or dipped finishes wear away, the marred original surfaces will again show through. These comments concerning mottled areas, streaks, etc., moreover, also apply if the resin is originally dye-colored. A uniform colored finish absent such aberrations has been difficult to obtain in practice.

The uses to which these products can be applied have thus been somewhat limited, and expensive finishing operations may well remove much of the low cost and simplicity advantages of the water-extended plastic.

It is mainly to the problem of providing color and surface stabilization in the forming of such water-extendable polyester resin plastics and the like that the present invention is directed; it being a primary object of the invention to provide new and improved processes for such forming that remarkably obviate the above-described disadvantages and directly and automatically consistently provide a uniform white finish in the catalytically cured product or article, or a uniform unmottled color if coloring is desired.

A further object is to provide such a novel process that eliminates texture variation, color and other bleeding, mottling, visible pores and other surface discontinuities in the cured product.

Still another object is to provide a new and improved control of the darkness and/or the shade of selected colored and uncolored areas of the cured water-extended polyester product, enabling predetermined surfaces selectively to be so colored and in different degrees.

An additional object is to provide a novel technique for forming or shaping such products.

Other and further objects will be hereinafter described and are more particularly delineated in the appended claims. In summary, however, in one of its broader aspects, the invention embraces a process for forming products from water-extendable polyester plastic resin chemically curable under the action of a catalyst, while stabilizing the texture and color of the surfaces of the product contacting the mold surfaces, that comprises, mixing the polyester plastic resin with water to extend the same into a homogeneous viscous mass while limiting air bubbles therein; adding and mixing curing catalyst into said mass to initiate the chemical curing of the same; applying the curing mass against air-impervious mold surface means; developing, and maintaining as the cure continues, an adherent seal between at least a part of the mass and the adjacent part of the mold surface means to keep air from the interface between the mass and said mold surface means; and breaking said seal after substantial gel cure and removing the plastic from the said mold surface means.

Since the apparatus with which the novel processes herein may be practiced may comprise well-known components, though arranged in novel fashion to execute the steps of the processes, it is not deemed necessary to provide drawings illustrating the same, particularly since the examples presented herein make clear the molding apparatus to those skilled in the art.

One of the discoveries underlying the success of the invention resides in the effect of forcing the development of an adherent air-impervious seal between, for example, the peripheral region of an exposed surface of the plastic mass under cure, and the adjacent parts of the mold or container to which the mass has been applied for curing. The seal is geometrically and physically disposed such that relative mold-plastic shrinkage does not break the air seal and so as to keep air out of the interfaces between the mass contacting the mold surface walls, while apparently forcing shrinkage and migration to occur within the interior of the curing mass, such that the brown or other discoloration forms at the exposed surface. Under such circumstances, it has been consistently found that the mold-restrained sides of the cured mass are uniformly white, unstreaked, unmottled and void of discontinuities or undesired texturing effect. If the mold surfaces are polished, as of ceramic, glass, polished metal, etc., the white cured mass surfaces thereadjacent will be shiny; and if the mold surfaces are dulled or matted, a matted white cured plastic surface will result—always void of brown or other streaks of the unstable effects before described. Where the mold surfaces are not hard, but of resilient air-impervious materials, as of appropriately thick and expansion-resistant or plastic mass-restraining silicone, rubber, polyethelene or highly plasticized polyvinyl chloride resilient surfaces and the like, re-entrant side lips or sealing rings and the like can aid in the development of an air seal, as later described.

Under such circumstances, the brownish color usually noted in the curing of such plastics is selectively confined to the exposed surface only, and is developed substantially uniformly over the exposed surface only.

While, moreover, the manufactures of the polyester resins recommend from about 1:1 to 1.5:1 proportions of water to resin (Ashland Technical Manual, before mentioned, for example), it has been found that, in the process of the present invention, somewhat more water is often desirable in the lightening of the dark color. Indeed, the use of somewhat more water makes the mixture-to-be-cured more viscous, as well, and when coupled with again somewhat more than the manufacturer's recommended one percent or so of catalyst per ounce of mass, enables lightening of the darkness and color shade almost to off-white even on the exposed cured surface, as later explained.

It has further been found that, instead of breaking the seal after full curing in the mold or container and then removing, as by alternate hot and cold water application, or prying, or air insertion or suction, the before-mentioned peripheral seal between the exposed curing mass and the adjacent parts of the mold surfaces may, at a rather critical time, be cut by knife or otherwise broken before the cure is complete. Under proper circumstances, as in a later-described example, the partially cured mass may be removed and bent or formed or shaped as desired and then left to complete the chemical cure—all with the assurance of maintaining the stable white (or deliberately colored) uniform surfaces where the mold surfaces had been sealed from air, and with the discoloration effect selectively occuring over the exposed or less-restrained surface of the mass, and with the shaping rigidly maintained.

The following examples illustrate the flexibility of the invention and the novel stabilization and control effected therewith that widens the applicability of these plastics and their usage while keeping mold and other fabrication costs low, and in most instances eliminating the need for post-molding finishing or, indeed, many different types and shapes of molds.

EXAMPLE 1

60 parts of water were added to 40 parts of polyester resin (AROPOL-WEP Ashland 661-P) and thoroughly mixed by a blade mixer to a homogeneous viscous mass, while restricting the formation of air bubbles by inserting the mixing blades low in the mass and controlling its speed. Into the mix, after about 2 minutes, preferably at the vortex formed near the mixer blades, about 1.6 drops per ounce of mass of liquid catalyst (Dupont 35% $H_2O_2$ in water) were poured into the mass and thoroughly mixed therein. The mass was then poured into an open Corning solid glass baking dish (serving as a mold) to a thickness of about one-half inch. It was found that the meniscus of the viscous mass when of this thickness (though very thin layers did not so work) within a few minutes, started to develop a bond or seal to the adjacent peripheral parts of the sides of the dish which promptly adhered and started to gel-harden, providing a tight air seal therebetween and preventing air communication with the interfaces between the mass contacting the side and bottom walls of the dish mold therebelow. The developing heat of the chemical curing was evident, and in about an hour and a half, complete curing was achieved. The exposed surface of the plastic mass had assumed a rather uniform brown color with minimal aberrations, chiefly pin-hole size discontinuities as if from bubbles.

The peripheral seal was thereupon broken with a knife blade and the external walls of the dish mold subjected to hot water and then cold water, such that the molded product was readily removed. The complete sides and bottom of the plastic product removed were pure white, totally uniform and entirely void of discontinuities, with no bubbles or irregularities whatsoever, no streaks, mottling or other aberrations of the prior art; and in this instance, were shiny, polished and substantially perfect. The discoloration (or brown color) was sharply and selectively confined solely to the exposed surface, which could serve as the back surface of the product that could well be used as a plaque or art surface.

EXAMPLE 2

The same procedure of Example 1 was carried out but with a greater ratio of water-to-polyester resin, just under 2:1; namely, substantially 65 parts water and 35 parts polyester resin, which is somewhat greater than upper limits generally recommended by the resin manufacturers. It was found that the increased water caused the mix to be more, not less, viscous, and that the brown exposed mold-cured surface of the plastic product was even more uniform and more free of spots or pin-size discontinuities. The pure white, polished and perfect other (side and bottom) surfaces of the product were produced as in Example 1.

As described in the above publications and patent, the water-extended polyester (a water-in-oil type of emulsion having an oil phase comprising a solution of unsaturated polyester in styrene, for example), may be catalyzed by other water-containing peroxide catalysts, including, as examples, Pennwalt-Lucidal Lupersol DSW, Norox W-60 (Norac Chemical), Percadox 48 (Naury Chemical Co.) and Aposet 720 (Apogel).

EXAMPLE 3

Example 2 was repeated but with variation of the said catalyst from 1.6 to about 3 drops per ounce of the mass—far in excess of the manufacturer's general instructions. It was found that the darkness and color shade of the exposed surface could be positively and selectively controlled—indeed lightened in a predictable manner by the amount of said catalyst within the above limits, as follows:

| Catalyst Drops Per Ounce of Plastic Mass | Approximate Time to Cure | Color of Exposed Plastic Surface | Color of Rest of Product |
| --- | --- | --- | --- |
| 1.6 | 1½ hrs. | Carmel colored | Pure white |
| 2.5 | 40 minutes | Lighter cream color (tan) | Pure white |
| 3.0 | 30 minutes | Off-white | Pure white |

It was observed that even though the amount of catalyst was increased, there was still about the same time prior to gel, unlike the experience generally in the plastic curing art; and that the time to cure lowered, but approached a value of about half an hour.

EXAMPLE 4

The proportions and procedure of Example 1 were performed in a somewhat flexible circular polyethelene container lid (solid—non-porous) about one-quarter of an inch deep. The lid was provided with a re-entrant lip in its side wall and an annular depression in its top wall, which served as the bottom of the mold in this experiment. It was observed that the said lip, with top-filling, aided in the development of the seal before discussed, and the conforming resilience of the mold walls prevented shrinking break-away from the curing mass such that the cured product had pure white surfaces molded adjacent the top wall, with a perfect reproduction of the annular depression, and the carmel brown coloration sharply confined to the exposed surface and a little edge therebelow above the lip region of the seal. The little pin-hole like depressions were produced in the exposed surface only, and the remainder of the product was a perfect matte white surface. Scratching such surface with the fingernail left indentations, but not discoloration.

EXAMPLE 5

The proportions and procedures of Example 3 with about 3 drops of said catalyst were used in a relatively thick-walled silicone rubber (impervious) eyedropper mold having a re-entrant annular lip or lid, the overall length of the dropper being about an inch. As in Example 4, with the air driven out in proper filling to the top of the mold and even with overpour to insure that shrinkage would not break the seal, it was observed that the said lip assisted in the prompt development and maintenance of the air seal. The walls provided conforming resilience that prevented shrinking break-away between the walls and the mass during curing under the sealed conditions. Removal after about an hour was effected by breaking the seal, peeling the sides of the resilient mold apart with pliers, and popping the piece out. The exposed top flat surface was off-white tan, but the complete rest of the product, conforming exactly to the dropper interior shape, was a perfect, smooth white, void of all aberration. Either inadequate filling of silicone molds, which results in shrinkage that causes the seal to break, or removal before complete gel-curing, was found to produce invariably the discoloration and texture aberrations avoided by the technique of the present invention.

EXAMPLE 6

The proportions and procedures of Example 2 were used; but after about 20 minutes in the glass mold, when the plastic mass was just partially gel-cured, but just beyond the quite tacky state, the peripheral seal was broken and the product removed from the mold. It was then bent into a predetermined curved shape by hand and left to continue to cure in the air. When cured, the shape was rigidly and permanently set and the same pure white color and stabilized perfect surfaces were produced as earlier described.

EXAMPLE 7

The proportion and procedure of Example 2 were used, but a colored dye (Tintex fabric dye) was added into the viscous mix-about 5 grams per ounce. The previously described pure white surfaces were now a uniform-color, again void of all streaks, discontinuities and other aberrations of prior art experience.

EXAMPLE 8

In my earlier U.S. Pat. No. 3,754,960, highly flexible quivery polyvinyl chloride (pvc) material (involving ratios of plasticizer-to-pvc of at least from about 400 parts to 100 parts) are described which are also useful as mold materials; and these have now been found to have the property of admirably sealing to the curing water-emulsified polyester plastic mass used herein and, indeed, shrinking, expanding and otherwise distorting in unison and conforming resilience with the curing mass, but with sufficient resistive holding action thereof, to enable the maintenance of the seal and the consequent results of the invention to be admirably obtained. With such a flexible mold of about ⅛ inch wall thickness, and with a water-to-polyester ratio and catalyst formulation as in Example 3, objects accurately conforming to the flexible mold and substantially pure white throughout the mold-contacting surfaces, have been repeatedly obtained.

It should be noted, however, that with very thin resilient mold walls, as of balloon thickness or the like, that do not provide sufficient resistance, pressure-holding or restraining action against the curing mass, and enable relative shrinking with respect to the plastic mass, these highly uniform and pure colored results have not been obtainable. This demonstrates the necessity for sufficient restraining pressure to be exerted by the mold surfaces against the curing mass under the seal, to force the distortion and discoloration effects inward and to the exposed or least restrained surface.

EXAMPLE 9

The last-named observations suggested the use of lesser restraining-wall materials in selected parts of the mold to produce selected and highly confined, predetermined colored areas, all in a single simultaneous molding operation. Thus the experiment of Example 3 was repeated, but with the highly resistant and polished hard glass mold containing a resilient patch of the resilient quivery mold material of Example 8 on its bottom surface. It was found that the cast material that contacted the less-restraining resilient patch was colored and somewhat matted, while the remainder of the molded mass that contacted the glass walls was pure white and shiny. In a single operation, therefore, different colors and/or textures were achieved at sharply defined and predetermined areas, providing a new degree of molding capability for mixed products.

EXAMPLE 10

In the other examples, the molded parts were removed following substantial curing by chemically generated heat and action. If the water-extended-polyester mass is removed from the mold prior to such heat-curing, it has been found that it will remain unstable. With the proportions of Example 3, however, such a prematurely removed mass has been subsequently externally heated, by oven immersion at about 200° F, and it has been found that the heat-cure cycle is caused to continue to completion.

EXAMPLE 11

Repetition of Example 3 under additional external heat in an oven has been found materially to reduce the time of complete cure. Unfortunately, however, such external treatment has also been found to crack the seal to the mold periphery (apparently because of forced curing before the mass has had a chance to expand), and thus to enable discoloration and other aberrations to be produced as before described.

In repeating Example 3 in a pre-heated mold (about 200° F), however, such reduced-time of curing has been successfully effected without seal-breakage, and with the desired uniform and stable surface results.

If desired, the mixing steps previously described may be followed with a conventional de-aeration stage if an even smoother exposed surface is desired; though the above process produces perfect surfaces adjacent the mold surfaces. Hardening layers as of nitrocellulose topcoats, described in said Scientific Shortcut publication, may also be applied to the surfaces, if desired. The invention, moreover, eliminates the need and cost of complex molds since it can readily be made in sheets and die-formed, shaped or cut, at appropriate times (even during curing as in Example 6), all while maintaining stable surfaces and producing a variety of desired shapes. The added flexibility of simultaneous selected area coloration and control thereof have also been described.

While the invention has been discussed in connection with the preferred application to molds having an open or exposed surface or region, it can be adapted to more closed systems as by injecting or pouring into two halves of appropriately thick silicone or similar molds and pushing them together to remove air and effect an air seal. In connection with mold materials that may not readily provide an adherent seal with these plastic masses, including some impervious resilient materials, sealing rings or lips or similar elements of other materials that will so adhere can be integrally incorporated into the mold surfaces to effect the required sealing conditions of the invention. In all cases tested to date, indeed, it appears that it is only the air-exposed or less-restrained surfaces or surface portions that suffer the discoloration and other deletereous effects, with something from the curing plastic mass forming or migrating to such surfaces.

It is clear that the techniques of the invention are applicable to other than the precise polyester resins and catalysts herein mentioned; and that these terms are thus used generically to embrace similar resins and equivalents as well.

Further modifications will also occur to those skilled in this art, such being considered to fall within the spirit and scope of the invention as defined in the appended claims.

What is claimed is:

1. A process for forming products from water-extendable polyester plastic resin chemically curable under the action of a catalyst, while stabilizing the texture and color of the surfaces of the product contacting the mold walls, that comprises, mixing the polyester plastic resin with water to extend the same into a homogeneous viscous mass while limiting air bubbles therein; adding and mixing curing catalyst into said mass to initiate the chemical curing of the same; inserting the curing mass into a mold having air-impervious side and bottom walls capable of exerting a substantial restraining pressure on the curing mass to prevent relative shrinkage at the interfaces between the mass and the mold walls and having a side wall region spaced from the bottom wall and defining the periphery of a surface of the curing mass that is not restrained by the mold except at said periphery; developing, and maintaining as the cure continues, an adherent seal between at least said periphery and the adjacent side wall region of the mold to keep air from the interfaces between the mass and the mold walls; and breaking said seal when gelation of the mass has progressed to the point where the texture and color of the mold-contacting surfaces of the mass are stable and removing the plastic from the said mold.

2. A process as claimed in claim 1 and in which said unrestrained surface of the mass is an exposed surface of the same.

3. A process as claimed in claim 1 and in which said mold has walls which exert conforming resilience pressure on the curing mass to prevent relative shrinkage at said interfaces during the curing under the said seal.

4. A process as claimed in claim 1 and in which said removing step comprises heating and then cooling the outer surface of said mold.

5. A process as claimed in claim 1 and in which said removing step comprises prying the plastic from the mold after breaking said seal.

6. A process as claimed in claim 1 and in which said removing step comprises suctioning the plastic from the mold after breaking said seal.

7. A process as claimed in claim 1 and in which said seal-breaking is effected prior to the completed curing of said plastic.

8. A process as claimed in claim 7 and in which, following said removing step, the partially cured plastic is formed into predetermined shape and then allowed to complete its cure.

9. A process as claimed in claim 1 and in which said seal-breaking is effected after the substantially complete curing of said plastic.

10. A process is claimed in claim 1 and in which the proportions of water and resin are between substantially 1.5:1 and 2:1.

11. A process as claimed in claim 10 and in which said proportions are substantially 65 parts water and 35 parts resin.

12. A process as claimed in claim 10 and in which the amount of said catalyst is between substantially 1½ and 3 drops per ounce of said mass.

13. A process as claimed in claim 2 and in which the darkness of the coloration of the said exposed surface is controlled by varying the amount of said catalyst.

14. A process as claimed in claim 13 and in which said darkness is varied from substantially carmel color with substantially 1½ drops of catalyst per ounce of the said mass, to off-white with substantially 3 drops of said catalyst.

15. A process as claimed in claim 1 and in which said air bubble limiting is effected at least in part by withdrawing air from the mass.

16. A process as claimed in claim 1 and in which the mold has hard walls.

17. A process as claimed in claim 1 and in which the mold has conformable resilient walls.

18. A process as claimed in claim 1 and in which coloring is added to said viscous mass.

19. A process as claimed in claim 1 and in which said unrestrained surface of the mass is exposed to the air and the seal occurs at least at the periphery of said exposed surface.

20. A process as claimed in claim 1 and in which said mold is closed to and substantially free of air during the said curing.

21. A process as claimed in claim 1 and in which said mold comprises highly plasticized resilient polyvinyl chloride.

22. A process as claimed in claim 1 and in which said mold has partly hard and partly resilient walls.

23. A process as claimed in claim 1 and in which at least one of texture and coloration is controlled at a selected area by varying the mold restraining pressure over such area.

24. A process as claimed in claim 23 and in which said mold is rendered resilient over said selected area and relatively hard at other areas.

25. A process as claimed in claim 1 and in which said mold is pre-heated before effecting the curing.

26. A process as claimed in claim 1 and in which the curing mass is simultaneously externally heated.

27. A process as claimed in claim 1 and in which said resin is selected from the group consisting of phthalic anhydride and isophthalic acid fused with maleic or fumarate anhydride and glycol and containing cross-linking styrene, used with an organic peroxide catalyst.

* * * * *